Feb. 5, 1963
G. C. BALDWIN
3,076,895
NEUTRON DETECTOR
Filed April 28, 1960
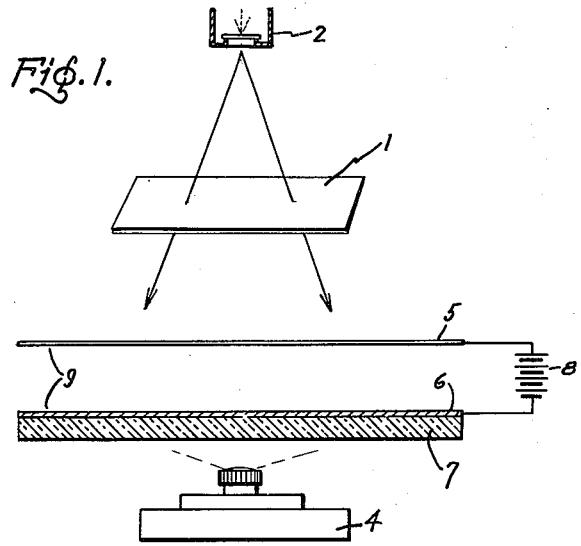
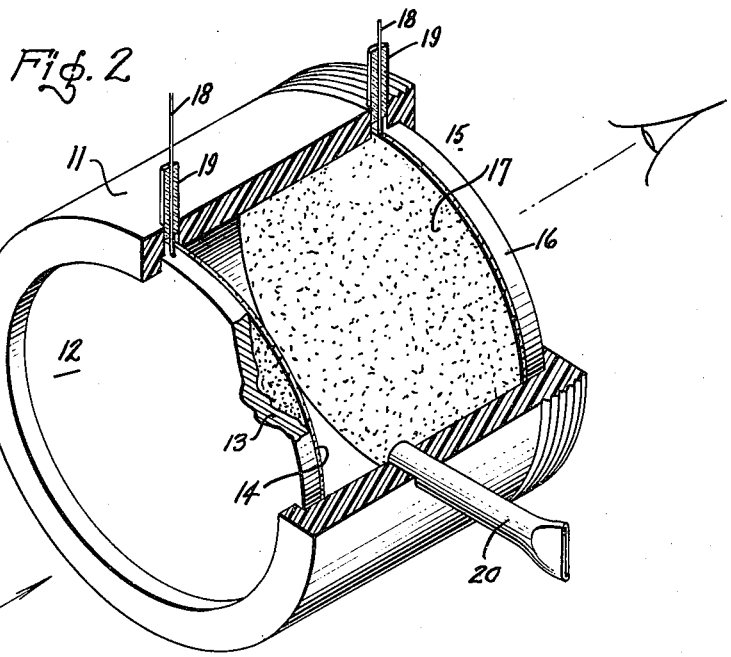
Inventor
George C. Baldwin
by J. David Blumenfeld
His Attorney

United States Patent Office 3,076,895
Patented Feb. 5, 1963

3,076,895
NEUTRON DETECTOR
George C. Baldwin, Schenectady, N.Y., assignor to General Electric Company, a corporation of New York
Filed Apr. 28, 1960, Ser. No. 25,468
8 Claims. (Cl. 250—83.1)

This invention relates to a neutron sensing and detecting device and more particularly to one which produces a visual indication of the impinging neutrons and which is, therefore, particularly useful in connection with neutron radiography.

Analysis by neutron radiography has been proposed as a potentially valuable addition to presently available analytical techniques such as X-ray and gamma ray radiography and contemplates irradiating a material with neutrons to determnie the characteristics and structure of the material from the absorption of the neutrons within the material. The advantages of neutron radiography over corresponding X-ray or gamma ray radiography techniques lie in the fact that the neutron absorption characteristic for various elements is unrelated to the atomic numbers of the materials, i.e., the neutron absorption coefficient for various elements is random, so that is becomes possible to analyze compounds made up of materials having only slightly differing atomic numbers, a result which is difficult if not impossible to achieve by X-ray or gamma ray radiography.

However, in order to utilize neutron radiography most effectively, it is desirable to provide some neutron sensing device which produces a visual representation of the neutron distribution since neutrons, unlike X-rays or gamma rays, are incapable of directly affecting such photosensitive materials as photographic emulsions or fluorescent materials. Although neutron sensing and detecting devices such as proportional counters filled with boron trifluoride ($BF_3$) and boron lined counters are available, devices of this type produce an electrical output and are of limited usefulness in neutron radiography where a visual representation of the neutron distribution is desired. In order to facilitate the widespread use of neutron radiography as an analytical technique, it is highly desirable to provide a neutron detecting and sensing device which produces a visual representation of the neutron distribution.

It is a primary object of this invention, therefore, to provide the neutron sensing device which produces a light pattern representative of the impinging neutron flux;

Another object of this invention is to provide a neutron sensing and detecting device which produces a visual representation of impinging neutron distribution patterns;

Yet another object of this invention is to produce a neutron sensing and detecting device which utilizes spark discharges to produce visual representation of the neutron distribution patterns;

Still another object of this invention is to provide a visual neutron sensing device of the spark discharge type which incorporates an optically transparent electrode element;

Other objects and advantages of this invention will become apparent as the description thereof proceeds.

A neutron detector is provided which includes a pair of electrodes, one of which is covered with a neutron sensitive ionizing-particle emitting material such as boron and the other of which is covered with an optically transparent conducting film. An energizing voltage is impressed across the electrodes, which is just below the magnitude necessary to produce spark-over.

A discrete spark discharge takes place at the point of neutron impingement on the one electrode so that the light patterns produced by the neutron induced spark discharges may be photographed to provide a visual representation of the neutron radiograph.

The novel features which are believed to be characteristic of this invention are set forth with particularity in the appended claims. The invention itself, however, both as to its organization and method of operation together with further objects and advantages thereof, may best be understood by reference to the following description taken in connection with the accompanying drawings in which:

FIGURE 1 is a schematic illustration of a neutron detecting apparatus embodying the principles of this invention; and FIGURE 2 is an isometric perspective of a neutron sensing and detecting device constructed in accordance with the invention.

Referring now to FIGURE 1 a specimen 1 which is to be analyzed is positioned in a neutron flux provided by a neutron source 2. The neutron producing source 2 may be of any suitable type such as a linear accelerator of the Cockroft-Walton type wherein a beam of charged particles impinges on a tritium ($H^3$) target, for example, which then emits neutrons. Alternatively, other charged particle accelerators such as cyclotrons, synchrocyclotrons may be utilized in place of the Cockroft-Walton linear accelerator. Neutronic reactors may also be employed as neutron sources, by allowing beams of neutrons to emerge through apertures in the enclosing shield.

The neutrons from the source 2 are absorbed in the specimen to a degree determined by its constitution and dimensions and impinge on a novel neutron sensing and detecting element 3 which produces a visible representation of the distribution pattern of the incident neutrons. The light pattern representing the incident neutrons is photographed by a camera or other light sensitive element indicated at 4 to provide a neutron radiograph of specimen 1.

The novel neutron sensing and detecting element 3 has a "spark counter" geometry and comprises a thin neutron sensitive electrode 5 positioned in spaced apart relationship with a second electrically conducting and optically transparent electrode 6 fastened to an optically transparent backing member 7, preferably constructed of glass. An electric field is established across space 9 between electrodes 5 and 6 by impressing a unidirectional energizing voltage from a battery 8, or the like, across the electrodes. The magnitude of the unidirectional voltage and the electric field is just below the critical spark-over potential for the particular operating conditions of gas pressure and electrode spacing. In the absence of incident neutrons the system is quiescent and there is no spark-over between the electrodes. As neutrons strike the neutron sensitive electrode 5, neutron induced disintegrations occur at the point of impact. The disintegrations are accompanied by the emission of ionizing fragments from the electrode into the interelectrode space. The ionizing fragments cause a localized electric field concentration in space 9 by reducing the length of the gas path on which the electric field acts. For a more detailed description of the breakdown mechanism, reference is made to Gaseous Conductors—Cobine, Dover Publications Inc., N.Y., 1941.

The electric field, which was just below the critical breakdown voltage for the original gas path, i.e., the distance between electrodes 5 and 6, is now high enough to break down the gas across the shorter path and a spark jumps between the electrodes at the point of impact of the neutron. The light pattern produced by the sparks jumping at each of the impact points represents the distribution pattern of the impinging neutrons and may be photographed by the camera 4 to provide a neutron radiograph of the specimen 1.

The neutron sensitive electrode 5 is preferably a thin metallic foil having a neutron sensitive material dispensed therein which undergoes neutron induced disintegrations and emits ionizing fragments which may either be ionizing nuclear particles, such as alpha particles, beta particles, or protons, for example, or fission fragments. A fissile material such as $U^{235}$ may be the neutron sensitive material in electrode 5 which, upon absorbing a neutron, undergoes fission and a fission product is then emitted into interelectrode space 9 to produce ionization and gas breakdown. Alternatively, materials such as boron[10] ($B^{10}$), which undergoes a neutron induced reaction to produce an unstable nuclide which decays with the emission of the nuclear ionizing particle, may be used as the neutron sensitive material. Using $B^{10}$ as an example, the following reaction takes place.

$$B^{10}+n \rightarrow Li^7+He^4+2.79 \text{ m.e.v.} \qquad (1)$$

Similarly, using lithium[6] ($Li^6$) as the sensitive substance, the reaction which occurs is $$Li^6+n \rightarrow H^3+He^4+4.79 \text{ m.e.v.} \qquad (2)$$

Thus in each reaction an alpha ($\alpha$) particle (i.e., $He^4$) is released into space 9 with kinetic energy sufficient to produce ionization and localized breakdown to form the spark discharge between the two electrodes. It will be apparent to those skilled in the art that many other materials having reaction cross sections with impinging neutrons may be utilized in place of the materials mentioned above without going outside the scope of the invention.

Electrode 6 is a continuous thin film of an optically transparent material which optimizes the resolution and sensitivity of the device. The optically transparent thin film geometry is preferable over discontinuous or grid geometries because it makes the entire volume sensitive to the neutron induced ionizing particle, which is not the case with discontinuous electrode geometries, and, therefore, the resolution of the device is greatly enhanced. Furthermore, the applied field across the interelectrode space is more uniform than it is with grid geometries so that the sensitivity of the device is greater. Electrode 6 is preferably deposited as a continuous thin metallic film having a high resistivity per square centimeter, and capable of transmitting electromagnetic radiation in the visible range. One suitable material having all of these desired characteristics is tin oxide which is vapor deposited from stannous chloride vapor onto a glass backing layer 7. The tin oxide is a semiconducting and refractory material and as such, it has proper electrical characteristics to act as an electrode material while transmitting electromagnetic radiation in the visible range. Tin oxide deposited on a glass supporting plate is commercially available and is sold by the Pittsburgh Plate Glass Company under their trade designation NESA coated glass. Thin metallic coatings as well as other semi-conducting materials besides tin oxide may of course be utilized without going outside the scope of the invention provided they have the desirable characteristics described above.

In discussing the general arrangement of the individual components making up the novel neutron detecting device of this invention, the various operating parameters and constructional features, such as gas pressure, applied voltage, electrode spacing, and their effect on the operational characteristics and sensitivity of the instrument were adverted to very briefly. It has been found that to obtain the optimum sensitivity for the neutron detecting and sensing device, the spacing between the electrodes 5 and 6 should be such that the ionizing particle emitted from the neutron sensitive electrode 5 expends its energy before reaching electrode 6. Thus, assume that the neutron sensitive substance dispersed in the electrode 5 is boron[10]. The alpha ($\alpha$) particle released in the reaction $$B^{10}+n \rightarrow Li^7+He^4+2.79 \text{ m.e.v.} \qquad (3)$$

shares the 2.79 m.e.v. energy released in the reaction with the lithium[7] ($Li^7$) and, frequently, with a gamma ($\gamma$) ray of 0.477 m.e.v. Roughly half of the alpha particle energy is, on the average, lost within electrode 5. Thus, on the average, the energy of the alpha particles is 0.74 m.e.v. and may be calculated as follows:

$$\tfrac{1}{2} \times \tfrac{7}{11} \text{ (mass ratio)} \times (2.79-0.477)=0.74 \text{ m.e.v.} \qquad (4)$$

As is well known, because of the thickness of the $B^{10}$ layer, the energy distribution of the alphas which emerge from the $B^{10}$ is not discrete, but will have a spectral distribution including energies between 1.78 and 0 m.e.v. It can be safely assumed, however, that the average energy of these particles will be nearly 0.74 m.e.v.

The linear range R in air of a 0.74 m.e.v. alpha particle is only about 6 millimeters at standard pressure and temperature. Converting this linear range of 6 millimeters in air to a mass range, i.e., a parameter independent of the density of the medium traversed by the particle, the mass range $$M=R \times \frac{\text{Density of air in gms.}}{\text{Vol. of air in cm.}^3 \text{ atm.}^{-1} \text{ mole}^{-1}}$$
$$=0.6 \times \frac{29}{22{,}400}=0.78$$

milligrams per $cm.^2$. The mass range M is independent of the pressure but the linear range R is pressure sensitive and may be determined for any pressure $p$ by the equation $$R=R_0 \frac{760 \text{ mm.}}{p} \qquad (5)$$

where $R$=the linear range at atmospheric pressure—6 mm. for 0.74 m.e.v. $\alpha$
$p$=the actual pressure in mm. of the gas in the gap 9.

For maximum sensitivity it is desirable to separate the electrodes 5 and 6 by an amount equal to the linear range R as defined by Equation 5.

Assuming further that air is utilized as the ionizable medium between electrodes 5 and 6 it can be ascertained, from available tabulations such as Table 432 of the Smithsonian Physical Tables, for example, that the spark-over potential between two plates is a function of the separation $d$ between the plates and the pressure of the gas $p$. Typical data from tables of this sort are given below.

| $d$, mm. | $p$, mm. | $pd$, mm.² | V | V/$dp$ |
|---|---|---|---|---|
| 2 | 750 | 1,500 | 8,200 | 5.5 |
| 5 | 750 | 3,750 | 17,450 | 4.7 |
| 5 | 350 | 1,750 | 9,340 | 5.3 |
| 5 | 100 | 500 | 3,580 | 7.2 |

It can be seen from these tabulations that the ratio of the spark-over voltage V to the product of the pressure $p$ and spacing $d$, i.e., $V/dp$ does not vary widely with the changes in $d$ and $p$. From Table 429 of the Smithsonian Physical Tables it can also be ascertained that the spark-over potential of a 6 millimeter air gap is 19,110 volts at normal atmospheric pressure of 760 mm. of mercury. Setting $d=R=6$ millimeters at normal temperature and pressure, the ratio of $V/dp=4.2$ which, although slightly lower than those previously tabulated in column 5 above, can be taken as roughly constant. So long as the plate separation corresponds to this mass range M, a spark-over voltage of nearly 19,000 volts is required. From these characteristics and tabulation, the magnitude of the D.C. supply for the electrodes 5 and 6 can be calculated for a given gas composition and pressure and electrode separation. Under some circumstances, it may be desired to use a lower voltage than 19,000 volts indicated above. This may be achieved by reducing the plate separation or pressure although in such an event some loss of sensitivity may be expected. Alternatively, a different medium than air may be used between the electrodes. In any event, these parameters may be manipulated as desired for any given operating conditions to provide a suitable neutron sensing and detecting device construction.

Referring now to FIGURE 2 there is illustrated a preferred embodiment of a neutron detecting and sensing device constructed in accordance with the instant invention and includes a cylindrical housing 11, preferably of insulating material, which is threaded at one end. The housing 11 is threaded at one end so that the entire neutron assembly may be threaded into an opening of a light tight chamber, not shown, in which a camera is mounted to take a picture of the light pattern produced by the sparks. One end of housing 11 is sealed by a neutron sensitive electrode 12 which is constructed of a neutron pervious base material 13, such as aluminum, and a thin film 14 of neutron sensitive boron$^{10}$ deposited on the base 13. The other end of the housing is sealed by an optically transparent electrode element 15 comprising an optically transparent supporting member 16, preferably of glass, and an optically transparent film of tin oxide 17. Electrical leads 18 supported in high voltage insulators 19 extend through the wall of housing 11 and into the interior. A filling tube 20 communicates with the chamber to admit a gas or air into the interior and is pinched off after the gas at the proper temperature and pressure is introduced.

The neutron sensitive boron-containing film 14 deposited on the surface of the neutron pervious aluminum plate 13 is fabricated by the thermal decomposition of diborane ($B_2H_6$). When diborane is passed over a heated metallic surface, it decomposes according to the following equation:

$$B_2H_6 \rightarrow 2B + 3H_2 \qquad (6)$$

and the boron B forms deposits on metal. The only products of this reaction, aside from boron and hydrogen, are volatile higher hydrides of boron, which, on continued heating, are also converted into elemental boron. The pyrolysis of diborane may be effected at temperatures as low as 200° C. However, it has been found that in order to produce a tough adhesive coat of boron on the aluminum, the aluminum must be heated to a temperature between 350–400° C. In this manner the satisfactory coating of boron$^{10}$ may be produced on the aluminum supporting plate. Neutron sensitive material, other than boron$^{10}$ may be deposited on an aluminum plate without going beyond the confines of the instant invention. For example, where a fissile material such as uranium$^{235}$ ($U^{235}$) is used as a neutron sensitive material, the uranium may be deposited electrolytically or by vapor reduction on the aluminum plate. Hence, it will be understood, that the technique for producing a film of boron ($B^{10}$) on an aluminum plate, as described above, is by way of example only and is not to be considered limiting in any way.

From the foregoing description it can be appreciated that the instant invention provides a neutron sensing and detecting device which is particularly useful in connection with neutron radiography techniques since the instrument produces a visual indication of an impinging neutron flux which has been caused to traverse a specimen to be analyzed by neutron radiographic techniques.

While particular embodiments of this invention have been shown, it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a neutron detecting device for producing a visible indication of an impinging neutron flux, the combination comprising means defining a discharge space including neutron sensitive electrode means for emitting ionizing particles into said discharge space in response to impinging neutrons, and optically transparent electrode means including an optically transparent electrically conducting film, means to establish an electric field across said discharge space, the magnitude of said electric field gradient being less than the critical value at which sparking occurs spontaneously whereby neutrons impinging on said sensitive electrode cause the emission of ionizing particles at the points of impingement and modify the electric field gradient at the points of emission to produce an observable spark pattern in response to an impinging neutron flux.

2. In a neutron detecting device for producing a visible indication of an impinging neutron flux, the combination comprising means defining a discharge space including neutron sensitive electrode means for emitting ionizing particles into said discharge space in response to impinging neutrons, and optically transparent electrode means including an optically transparent electrically conducting film, means to impress a voltage on said electrode means to establish an electric field across said discharge space, the magnitude of said voltage being such that the electric field gradient is less than the critical value at which sparking occurs spontaneously whereby neutrons impinging on said sensitive electrode cause the emission of ionizing particles at the points of impingement and modify the electric field gradient at the points of emission to produce an observable spark pattern in response to an impinging neutron flux.

3. In a neutron detecting device for producing a visible indication of an impinging neutron flux, the combination comprising means defining a discharge space including neutron sensitive electrode means, said sensitive electrode means including a material which reacts with impinging neutrons and emits an ionizing particle into the discharge space, and optically transparent electrically conducting film, means to establish an electric field across said discharge space, the magnitude of said electric field gradient being less than the critical value at which sparking occurs spontaneously whereby neutrons impinging on said sensitive electrode cause the emissions of ionizing particles at the points of impingement and modify the electric field gradient at the points of emission to produce an observable spark pattern in response to an impinging neutron flux.

4. The neutron detecting device of claim 3 wherein the material which reacts with said neutrons is a fissile material and emits ionizing fission fragments.

5. The neutron detecting device of claim 3 wherein the material which reacts with said neutrons is one which forms an unstable nuclide by interaction with the neutrons which nuclide decays with the emission of ionizing particles.

6. The neutron detecting device of claim 3 wherein the neutron sensitive electrode means includes boron$^{10}$ which forms an unstable nuclide upon interacting with neutrons and decays with the emission of alpha ($\alpha$) particles.

7. In a neutron detecting device for producing a visible indication of the distribution of an impinging neutron flux a pair of electrode means defining a discharge space, one of said electrode means including a neutron sensitive material for emitting ionizing particles into the discharge space in response to impinging neutrons, the other of said electrodes including an electrically conducting optically transparent film, means to impress an energizing voltage on said pair of electrode means to establish an electric field gradient across the discharge space, the magnitude of said voltage being such that electric field gradient is less than the critical value at which sparking between the pair of electrode means occurs spontaneously whereby the emission of ionizing particles in response to impinging neutrons modifies the field gradient at the points of emission to produce an observable spark pattern corresponding to the distribution of the impinging neutron flux.

8. A neutron measuring device comprising a gas-tight housing, an ionizable gaseous medium within said housing, a neutron sensitive electrode means disposed in said housing for emitting ionizing particles into said gaseous medium in response to impinging neutrons, further electrode means secured to said housing and spaced from said neutron sensitive electrode means, terminal means connected to the respective electrode means and adapted to have a voltage impressed thereon which establishes an electric field between said electrodes, said further electrode means comprising an electrically conducting optically transparent film whereby neutron induced ionizing particles from said sensitive electrode means produce sparking between said electrode means which is externally visible through said further electrode means.

References Cited in the file of this patent

Operating Characteristics of the Spark Counter, by Saha et al., from Nucleonics, vol. 15, No. 6, June 1957, pp. 94–97.

Spark Counters as Neutron Image Intensifiers, by Reiffel, from Review of Scientific Instruments, vol. 29, No. 12, December 1958, pp. 1151–1153.